US008447994B2

(12) United States Patent  (10) Patent No.: US 8,447,994 B2
Nussbaum et al.  (45) Date of Patent: *May 21, 2013

(54) ALTERING PERFORMANCE OF COMPUTATIONAL UNITS HETEROGENEOUSLY ACCORDING TO PERFORMANCE SENSITIVITY

(75) Inventors: Sebastien Nussbaum, Lexington, MA (US); Alexander Branover, Chestnut Hill, MA (US); John Kalamatianos, Arlington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/508,929

(22) Filed: Jul. 24, 2009

(65) Prior Publication Data

US 2011/0022833 A1  Jan. 27, 2011

(51) Int. Cl.
 *G05B 13/02* (2006.01)
 *G06F 1/00* (2006.01)

(52) U.S. Cl.
 USPC ........... 713/300; 713/310; 713/320; 713/321; 713/322; 713/323; 713/324; 713/330; 713/340

(58) Field of Classification Search
 USPC .................. 713/300, 310, 320–324, 330, 340
 See application file for complete search history.

(56) References Cited

U.S. PATENT DOCUMENTS

| 7,359,727 | B2 * | 4/2008 | Tsien et al. ................... 455/522 |
| 7,971,073 | B2 * | 6/2011 | Hsu et al. ....................... 713/300 |
| 2002/0087904 | A1 | 7/2002 | Cai |
| 2007/0168055 | A1 * | 7/2007 | Hsu et al. ......................... 700/32 |
| 2008/0307240 | A1 | 12/2008 | Dahan et al. |
| 2009/0235108 | A1 | 9/2009 | Gold et al. |
| 2010/0122101 | A1 | 5/2010 | Naffziger et al. |
| 2011/0239006 | A1 * | 9/2011 | Hsu et al. ....................... 713/300 |

FOREIGN PATENT DOCUMENTS

WO  2007056705 A2  5/2007

OTHER PUBLICATIONS

International Search Report and Written Opinion mailed Nov. 4, 2010 in PCT App. No. PCT/US2010/043029, 8 pages.
International Search Report and Written Opinion mailed Nov. 5, 2010 in PCT App. No. PCT/US2010/043032, 8 pages.
U.S. Appl. No. 12/508,935, filed Jul. 24, 2009 and naming as inventors Sebastien Nussbaum et al.
U.S. Appl. No. 12/508,902, filed Jul. 24, 2009 and naming as inventors Sebastien Nussbaum et al.
International Search Report and Written Opinion mailed Nov. 3, 2010 in PCT App. No. PCT/US2010/043035, 8 pages.

* cited by examiner

*Primary Examiner* — M Elamin
(74) *Attorney, Agent, or Firm* — Abel Law Group, LLP

(57) ABSTRACT

One or more computational units of a computer system are selectively altered in terms of performance according to which of the one or more computational units has a higher performance sensitivity than others of the computational units.

18 Claims, 5 Drawing Sheets

ALTERING PERFORMANCE OF COMPUTATIONAL UNITS HETEROGENEOUSLY ACCORDING TO PERFORMANCE SENSITIVITY

BACKGROUND

1. Field of the Invention

This invention relates to power allocation in computer systems and more particularly to allocating power to improve performance.

2. Description of the Related Art

Processors run at various performance levels in an effort to match power consumption to work load requirements. The performance levels are typically determined by voltage/frequency combinations used by the processor. As processors become ever more highly integrated with multiple cores and other functionality, the power and thermal considerations remain of considerable importance.

SUMMARY OF EMBODIMENTS OF THE INVENTION

In order to provide improved performance, an embodiment enables analysis of workload executed on computational units, such as processing cores and graphics processing units, based on a power allocation strategy based on a computational unit's performance sensitivity to a change in performance capability resulting from, e.g., a frequency change, and available power headroom in the system—to improve system performance within a constant power envelope.

Accordingly, in one embodiment, a method is provided for operating a computer system that includes a plurality of computational units. The method includes selectively altering performance of one or more of the computational units according to respective performance sensitivities of the computational units. The method may include selectively altering performance of the one or more processing cores according to which of the one or more computational units has a higher performance sensitivity than others of the computational units. In an embodiment, the method further includes, if a predicted power margin resulting from boosting performance of a group of processing cores is less than zero, removing a core with low boost sensitivity from the group to form a smaller group; and calculating a new predicted power margin and determining if the new predicted power margin is greater than zero if performance of the cores in the smaller group is boosted. If it is, the performance of the cores in the smaller group is boosted.

In another embodiment, a method is provided for operating a computer system that includes a plurality of processing cores. The method includes, if a predicted power margin resulting from boosting performance of a group of the cores is less than zero, one or more cores from the group are eliminated, according to performance sensitivity of the one or more cores being lower than performance sensitivity of other of the cores, until the predicted power margin is greater than zero. The cores in the group are then boosted by increasing at least a frequency of clock signals being supplied to the remaining cores.

In another embodiment, an apparatus is provided that includes a plurality of computational units. The apparatus further includes a storage to store performance sensitivity information for the computational units. A power allocation function, implemented in hardware, firmware, and/or software, boosts performance of one or more of the computational units according to the performance sensitivity information.

DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

There are several methods which have been proposed to opportunistically raise the performance level (e.g., raise the frequency) of CPU cores on multi-core processors, when the processor integrated circuit is running below its thermal design point (TDP). The actual thermal point at which the integrated circuit is running may be determined by thermal measurement, switching activity measurement or electrical current measurement. Such approaches allow the operating frequency of the CPU cores to be raised together when there is estimated power, current or thermal headroom in order to improve performance under a given TDP, and decreased when the operation is exceeding those limits. Such approaches have assumed all active CPU cores operate in their maximum performance state when their frequency is raised in a coordinated fashion.

Another approach provides power reallocation between CPU cores. A core in P0 (highest performance state set by the operating system (OS)) may be over-clocked by reallocating power headroom available on the other core(s) whose performance state is below some threshold (defined by a lower performance state).

The above approaches for homogenously increasing power to all cores or to one or more cores based on performance states of the cores, allow for power to be reallocated from idle computational units, such as the CPU or graphical processing unit (GPU), but treat all active units homogeneously when dithering frequency or boosting steady state frequency. However, some active cores or other computational units may be gaining little or no performance increase from a higher core frequency, while other cores or computational units may be running workloads with a higher sensitivity to an increase in core frequency. Selectively distributing power among the active cores or other computational units based on frequency sensitivity allows for greater overall system throughput on heterogeneous workloads or multithreaded workloads with heterogeneous threads. That requires an effective approach to identify workload sensitivity to changes in core frequency.

Figure 1:
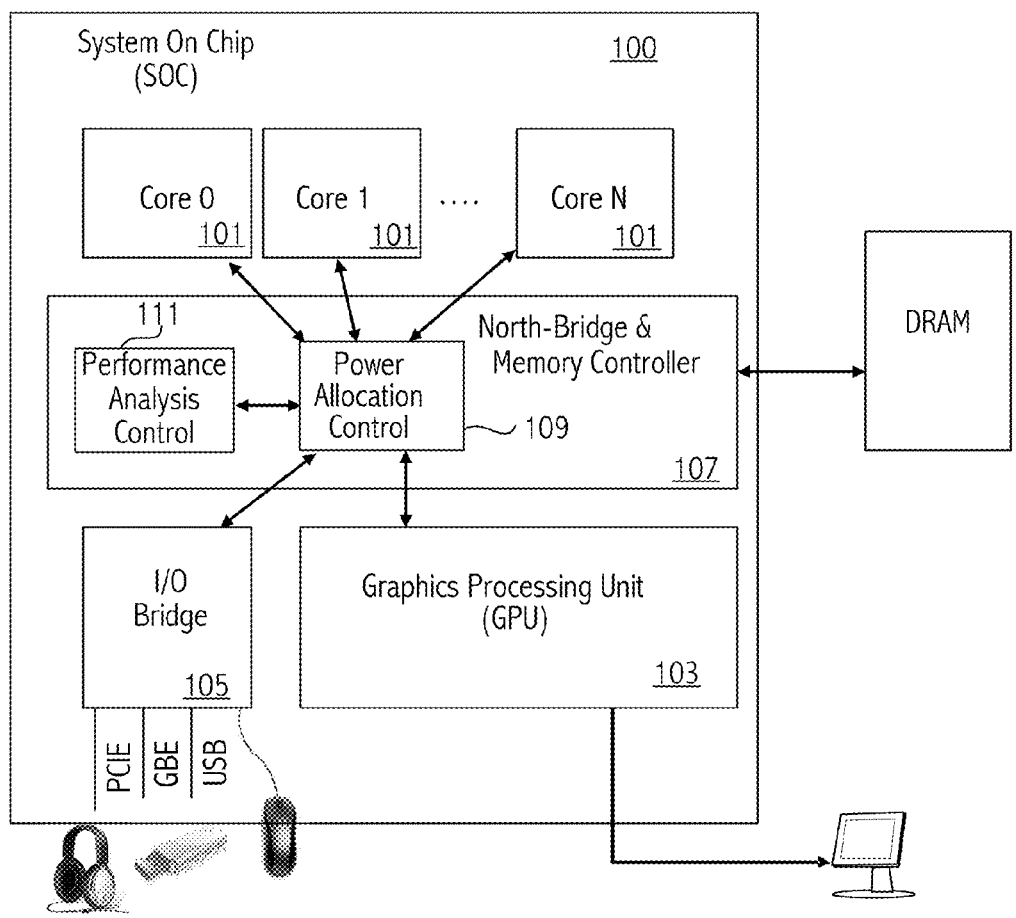
FIG. 1 shows a high-level block diagram of an exemplary System on a Chip (SOC) system according to an embodiment of the invention.

FIG. 1 shows a high-level view of an exemplary System on a Chip (SOC) 100 incorporating an embodiment of the invention. The SOC 100 includes multiple CPU processing cores 101, a GPU (Graphics Processing Unit) 103, an I/O Bridge 105 (named South-Bridge in some embodiments) and a North-Bridge 107 (which may be combined with the Memory Controller in some embodiments). The power allocation controller 109 is the functional element that controls allocation of the Thermal Design Point (TDP) power headroom to the on-die or on-platform components. The performance analysis control logic 111 analyzes performance sensitivity of the cores and other computational units as described further herein. Note that while the power allocation control 109 and performance analysis center 111 are shown as being part of the North-Bridge 107, in other embodiments they may be located elsewhere in the SOC 100.

A TDP (Thermal Design Point) represents the power that can be consumed by the entire SOC and depends on such factors as the form-factor, available cooling solution, AC adapter/battery, and voltage regulator. The SOC performance is optimized within the current TDP and in an embodiment, the power limit corresponding to the TDP is never exceeded. Assume the SOC power limit is the SOC_TDP_Limit. SOC characterization is typically based on allocating maximum power for each of the on-die components while staying within the SOC_TDP_Limit. That occurs by setting the highest operational point (in frequency (F) and voltage (V)) so that even maximally anticipated activity executed at this operational point will not cause the power to exceed the allocated envelope. For example, assume that maximum power of a 4-Core SOC is limited by a 40 w TDP envelope. Table 1 itemizes the power budget allocated for each of the on-die components:

TABLE 1

| On-die component | Allocated Power |
| --- | --- |
| Core0 | 8 w |
| Core1 | 8 w |
| Core2 | 8 w |
| Core3 | 8 w |
| GPU | 5 w |
| Memory Controller | 2 w |
| I/O Bridge | 1 w |
| Total | 40 w |

The 8 w power budget is a limit that defines the highest nominal operational point (F,V) of the core and the 5 w power budget does the same for the GPU. That allocation, however, is conservative and only a nominal maximum since it assumes simultaneous utilization of all on-die components. Most real-world applications are either CPU or GPU-bounded. Even if an application engages both computing engines (e.g., playback video off-loads some tasks to the processor cores), it does not utilize all 4 processor cores. Even CPU-bounded client applications mostly utilize 1-2 processor cores (1-2 thread workloads) and only a few of them have sufficient parallelism for utilizing all 4 cores for long periods of time.

An embodiment provides reallocation of the power from idle or less active components to the busy components by having more power allocated to the busy ones. For example, in a workload sample where 2 out of 4 cores are idle and GPU operates at half power, then the power budget table reflecting this state is shown in Table 2:

TABLE 2

| On-die component | Allocated Power | Remarks |
| --- | --- | --- |
| Core0 | 16.75 w | Core can run at higher F, V to fill new power headroom |
| Core1 | 16.75 w | Core can run at higher F, V to fill new power headroom |
| Core2 | 0.5 w | Assume that idle core consumes 0.5 w |
| Core3 | 0.5 w | Assume that idle core consumes 0.5 w |
| GPU | 2.5 w | |
| Memory Controller | 2 w | |
| I/O Bridge | 1 w | |
| Total | 40 w | |

Core0 and Core1 are allocated 16.75 w to improve overall CPU throughput. The operational point (F,V) of both cores may be increased to fill the new power headroom (16.75 w instead of 8 w). Alternatively, the power budget of only one core can be increased to 25.5 w, while the other core can be left with an 8 w power budget. In such a case, the core with the increased power budget may be boosted to an even higher operational point (F,V), so that the new power headroom (25.5 w) can be exploited. In this specific case, the decision whether to equally boost two cores or provide all available power headroom to one core is dependent on what is the best way to improve the overall SOC performance.

Boost Sensitivity Training and Data Structure

According to an embodiment, one way to determine how to allocate power between Core0 and Core1 to try and achieve improved performance gain is to know which of the two cores, if any, can better exploit an increase in performance capability provided, e.g., by an increase in frequency. Changes in performance capability may also be provided by, e.g., a change in the amount of cache available to the core, the number of pipelines operating in the core, and/or the instruction fetch rate. In order to evaluate which of the cores can better exploit an increase in performance capability, in one embodiment, performance sensitivity of each computational unit to frequency change and/or other change in performance capability, also referred to herein as boost sensitivity, is determined and stored on a computational unit basis.

Figure 2:
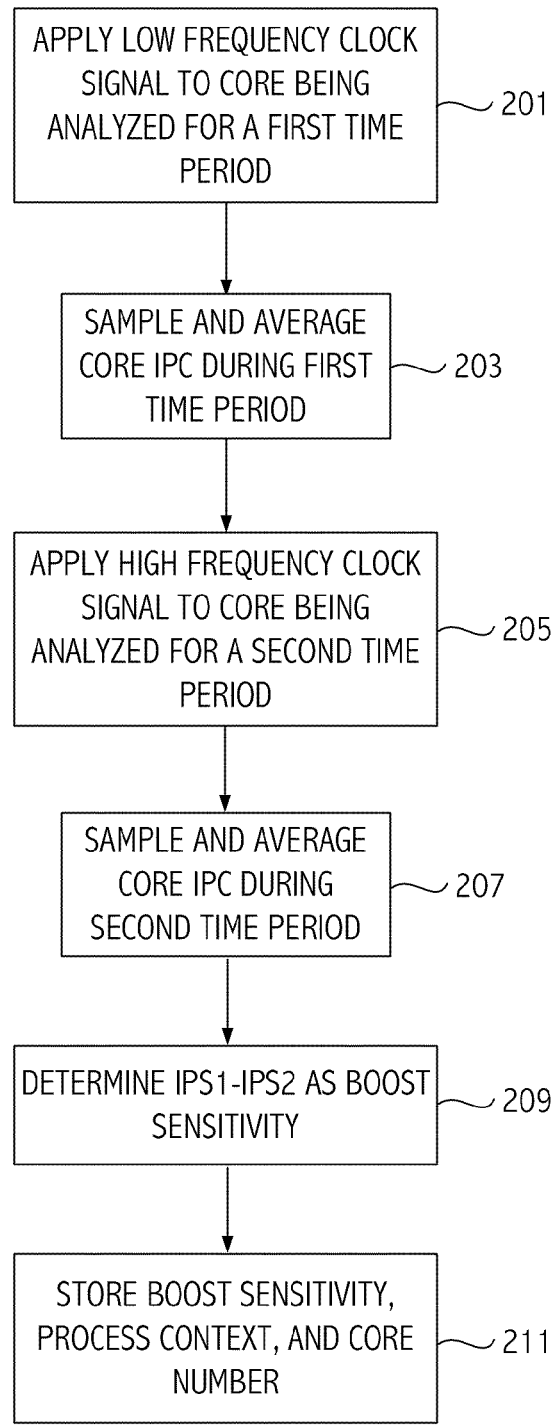
FIG. 2 illustrates a high-level flow diagram for profiling performance sensitivity to core frequency changes according to one embodiment of the invention.

Referring to FIG. 2, illustrated is a high-level flow diagram for profiling performance sensitivity to core frequency changes according to one embodiment of the invention. First, at 201 a pre-defined low frequency clock signal is applied to the CPU core being analyzed for a predetermined or programmable interval, e.g., a 100 us-10 ms interval. During that interval, the hardware performance analysis control logic (see FIG. 1, element 111) samples and averages core instructions per cycle (IPC) (as reported by the core). The performance analysis control logic determines a first instructions per second (IPS) metric based on the IPC×Core frequency (the low frequency). The IPS metric may be stored in a temporary register "A". Then, in 205 the performance analysis control logic causes a pre-defined high frequency clock signal to be applied to the CPU core being analyzed for the same predetermined or programmable time interval. The performance analysis control logic again samples and averages core IPC (as reported by the core) in 207. The performance analysis control logic determines a second instructions per second (IPS) metric based on the IPC×Core frequency (the high frequency) and stores the second IPS metric in a temporary register "B". The performance analysis control logic determines the numerical difference between A and B in 209 and stores the result in a performance or boost sensitivity table along with the core number being analyzed and the process context number running on the CPU core during the analysis. Note that other changes in performance capability may be utilized instead of, or in conjunction with, frequency changes to determine boost sensitivity.

The context number may be determined by the content of the CR3 register or a hash of the CR3 register to allow for a shorter number to be stored. This numerical difference represents the boost sensitivity for the core. That is, it represents the sensitivity of the core, running that particular process context, to a change in frequency. The greater the sensitivity, the more performance increase is to be gained by increasing the frequency. The same training shown in FIG. 2 is applied to each of the processor cores and to any other component that can be boosted (over-clocked) above its nominal maximum power value and the values are stored in the boost sensitivity table. The values in the boost sensitivity table may be sorted in descending order starting with the core or other on-die component with the highest boost sensitivity.

In other embodiments, frequency sensitivity training is applied to all computational units whose frequency can be changed to implement various performance states, regardless of whether they can be clocked (or overclocked) above a nominal power level. In that way, systems can still allocate power budget to cores (or other computational units) that are more sensitive to frequency change and away from cores that are less sensitive to a change in frequency. In that way, cores or other computational units may have their frequency reduced to save power without a significant performance decrease for the SOC.

Figure 3:
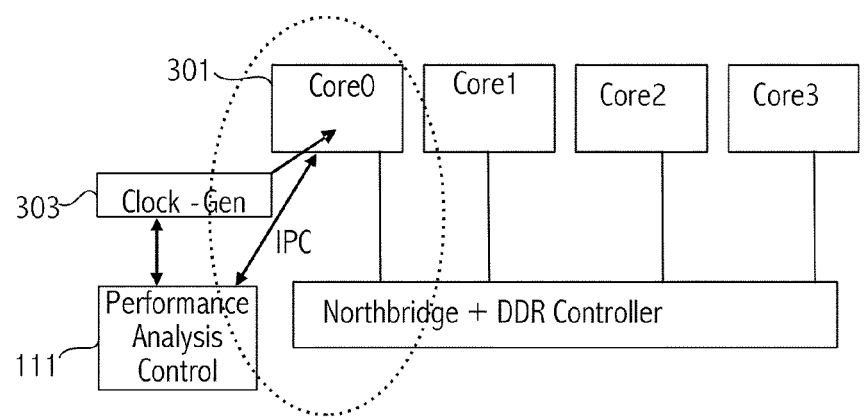
FIG. 3 illustrates frequency training at a system block diagram level.
Figure 4:
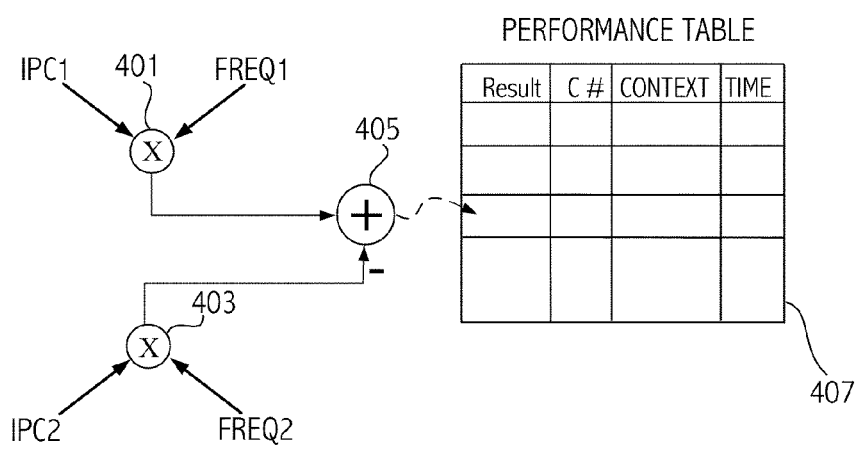
FIG. 4 illustrates additional aspects of frequency training.

FIG. 3 illustrates frequency training at a system block diagram level. Core 301 is representative of the frequency training for each core. The clock generator 303, as controlled by the performance analysis control logic 111, supplies the high and low frequency clock signals to core 301 during the frequency period. The core 301 supplies the instructions per cycle value to the performance analysis control logic 111, which controls the process in accordance with FIG. 2. FIG. 4 illustrates an instruction per cycle measurement (IPC1) that is determined by sampling and averaging during a first time period, being multiplied in multiplier 401 by the frequency (FREQ1) supplied during the first time period. Similarly, instructions per cycle measurement (IPC2) determined during a second time period, is multiplied in multiplier 403 by the frequency (FREQ2) supplied during the second time period. A difference in utilization metrics determined in multipliers 401 and 403 is determined in summer 405. The result is the boost sensitivity, which is stored in boost sensitivity table 407. Boost sensitivity table 407 stores for each measurement along with the result, the core number (C#), the process context running on the core, and the time elapsed since the last performance sensitivity measurement. The result is the performance metric or boost sensitivity expressed, e.g., as Instructions Per Second (IPS) computed via Average IPC× Core Frequency. Note that the boost sensitivity table may be storage within the SOC 100 (FIG. 1) or elsewhere in the computer system.

The boost sensitivity for each core is tied to the current processor context, which can be approximated by the x86 register value of CR3, tracked by the North-Bridge. In one embodiment, when the context changes, the sensitivity is re-evaluated. In another embodiment, the boost sensitivity expires for each context based on a fixed or programmable timer (e.g., after 1-100 ms). In still other embodiments, both a timer and context switch, whichever occurs first, are used to initiate the boost sensitivity reevaluation.

Thus, one embodiment has been described for frequency training. The functionality in FIG. 2 may be implemented in hardware (e.g., state machines in performance analysis control block 111), in firmware (in microcode or a microcontroller), or in software (e.g., a driver, BIOS routine or higher level software). Software may be responsible to kick off the low and high frequency clock signals, receive the IPC values, average the IPC values and perform the other functions described in relation to FIG. 2. The software may be stored in computer readable electronic, optical, magnetic, or other kinds of volatile or non-volatile memory in the computer system of FIG. 1 and executed by one or more of the cores. In still other embodiments, the frequency sensitivity training, illustrated in FIG. 2, and described above, is implemented partly in hardware and partly in software according to the needs and capabilities of the particular system. For example, software may be responsible for maintaining the boost sensitivity table, reading the CR3 register to determine process context, and maintaining software timers to re-determine boost sensitivity, while the hardware, when notified by the software, applies the clocks with the first and second frequencies for the appropriate time period and determines the average IPC. The software may be responsible for determining the IPS values.

Power Budget Reallocation

The Boost Sensitivity Table (BST) is maintained as a result of a frequency sensitivity training session for the components to be potentially boosted. In other embodiments, a frequency sensitivity table is maintained as a result of the frequency sensitivity training for all components whose performance can be adjusted, typically through adjusting frequency (and voltage if necessary). In an embodiment, power budget reallocation uses the information in the BST to decide which on-die component(s) are the most sensitive to boosting and thus "deserve" to get a higher TDP power margin reallocated when a reallocation takes place.

A particular processor core may be in one of N performance states. A performance state is characterized by a unique pair of core voltage and frequency values. The highest performance state is typically selected and characterized so that any anticipated activity will not cause the core power (dynamic+static) to exceed the power budget allocated for the core. In current systems, the core performance state is defined by the operating system software guided by current core utilization. In other embodiments, the core performance state may be specified by hardware, based on the context currently executed by the core. Table 3 shows performance states for an exemplary system having four performance states (P0, P1, P2, and P3) that the operating system (OS) (or any other high-level software) may utilize for each core, depending on the core utilization over a time-interval. The time-interval in one exemplary operating system ranges from 1 msec to 100 msec. Two idle states are used when the OS (or any other high-level SW) sets the core to a low C-state. A C-state is a core power state. In this specific embodiment, the core may be placed either in an IDLE state (when it is expected to be idle for a short time) or in a deep C-state. The highest operational point (P-boost) is the one when core power (CoreBoostPwr) exceeds the nominal maximal power budget allocated for that specific core.

TABLE 3

| Core Performance States | Operational point (F, V) | Power (dynamic and static) consumed in this point | Remarks |
|---|---|---|---|
| P-boost | F-boost/V-boost | CoreBoostPwr | Boost point. Power budget of the Core has been exceeded |
| P0 | F0/V0 | Core_Pwr0 | Core Power Budget |
| P1 | F1/V1 | Core_Pwr1 | |
| P2 | F2/V2 | Core_Pwr2 | |
| P3 | F3/V3 | Core_Pwr3 | |
| Idle | Clocks Off/Low voltage | Core_Idle_Pwr | |
| Deep Cstate | Clocks Off/Power Off | Core_DeepCstate_Pwr | Core is either power gated or deep voltage is applied |

The GPU Power state is traditionally controlled by software (the graphics driver). In other embodiments, it may also be controlled by hardware tracking the GPU activity and receiving information from other graphic-related engines (Unified Video Decoder (UVD), Display, etc.). In one exemplary embodiment, the GPU may be in one of four power states, as shown in Table 4.

TABLE 4

| GPU Performance States | GPU Power (dynamic and static) consumed in this point |
|---|---|
| GPU-boost | GPUBoostPwr |
| GPU_P0 | GPU_Pwr0 |
| GPU_P1 | GPU_Pwr1 |
| GPU_P2 | GPU_Pwr2 |
| GPU_P3 | GPU_Pwr3 |

In one embodiment, only two on-die components: core processors and the GPU, may be boosted to a higher performance point. The I/O module and the memory controller may contribute to the boosting process of the cores or the GPU by reallocating their "unused" power budget to these components, but they cannot be boosted themselves. In other embodiments, the memory controller may be boosted as well by transitioning the Dynamic Random Access Memory (DRAM) and its own frequency to a higher operational point.

One embodiment to allocate power efficiently to computational units is predicated on permanently tracking the available power headroom, or TDP power margin. SOC_TDP_Margin is calculated by subtracting the sum of the power consumption of all on-die components from the SOC_TDP_Limit: SOC_TDP_Margin=SOC_TDP_Limit−ΣCore(i) Pwr−GPU Pwr−Memory Controller Pwr−I/O Bridge Pwr. Any change in the state of the on-die components triggers an update of the SOC_TDP_Margin value. In one embodiment, the change of state that triggers the update is a change in performance or power state or change in application/workload activity. In other embodiments, the change of state triggering the update may be a process context change, or either a process context change or a performance state change. In an embodiment, any event resulting in a change in power consumed by the component, such as a change in performance/power state or change in application/workload activity, can function as the change of state triggering event.

In general, the power of a particular computational unit (voltage×current) is based on the frequency of the clock signal, the supply voltage, and the amount of activity in the computational unit. The particular approach to determine the power of each computational unit may vary according to system capabilities and needs and may be implemented based on hardware and/or software approaches. For example, in one approach, a computational unit calculates and reports an average power value as=dynamic power+static power. Dynamic power can be calculated as=(average workload activity/maximal activity)×MaxPower, where MaxPower is a fused or configurable value of the maximal dynamic power associated with maximal activity. Static power is dependent on the voltage at which the computational unit is running and can be extracted from a table, or otherwise made available from power management resources, or determined in hardware. The average workload activity can be calculated as an average number of signal toggles across the computational unit over the interval, or average IPC over the interval. Power calculations may utilize software methods as well in which the software (e.g., a driver) is aware of the application activity running in the computational unit and determines average power using a similar approach to that described above.

In an embodiment, only a core residing in a P0-state and the GPU residing in GPU_P0-state can be reallocated power from the other on-die components and boosted to a higher performance point. That is based on the observation that a core in P0-state and a GPU in GPU_P0-state are essentially hints (provided by the OS or some high-level SW such as the graphics driver) that the currently executed task is computationally bounded. In other embodiments, the core and/or the GPU may be boosted when they reside in other non-idle states.

Figure 5:
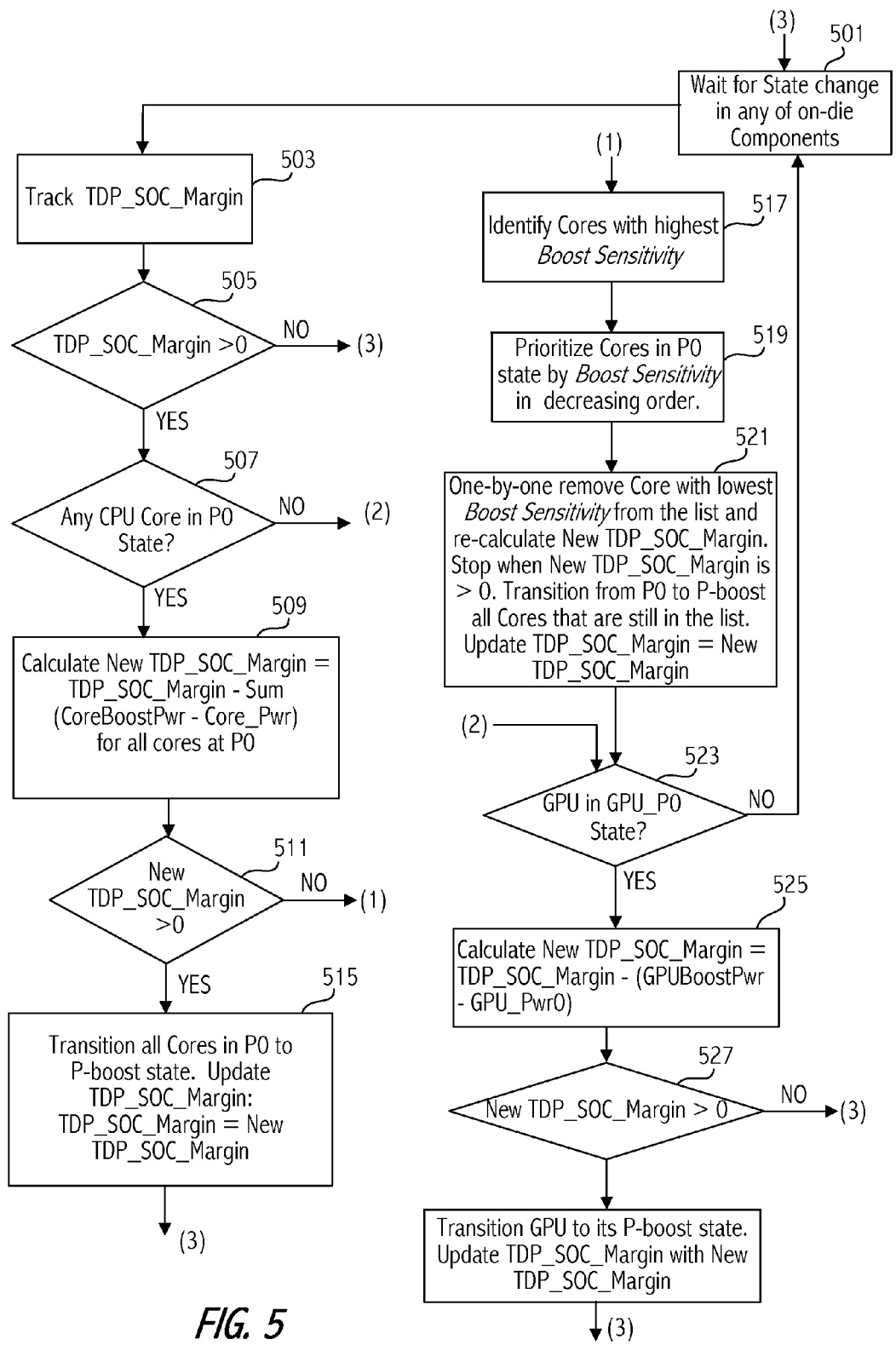
FIG. 5 illustrates an exemplary flow diagram of power reallocation according to an embodiment of the invention.

FIG. 5 illustrates an exemplary flow diagram of operation of an embodiment of the power allocation controller 109 (FIG. 1) to allocate power. In 501, the power allocation controller waits for a state change for any of the on-die components, e.g., a performance state, application/activity change, or process context change. When a state change occurs, the TDP_SOC_Margin is tracked in 503 and a determination is made in 505 whether the margin is greater than 0. If it is not, the flow goes to 501. If the margin is greater than zero, meaning that there is headroom to boost one or more cores, a check is made to see if any CPU core is in the P0 state in 507. In this particular embodiment, only cores in P0 can be boosted. If no cores are in P0, the flow checks on the GPU power state in 523. If at least one core is in P0, the power allocation controller checks if there is sufficient room to boost all the P0 cores by calculating in 509 a New TDP_SOC_Margin=TDP_SOC_Margin−Σ(CoreBoostPwr−Core_Pwr) for all cores at P0. The New TDP_SOC_Margin is the predicted margin value assuming all cores in P0 are boosted. TDP_SOC_Margin is the current margin value. CoreBoostPwr is the core power when boosted and Core_Pwr is the current core power in the P0 state. The power allocation controller checks in 511 if that new margin is greater than zero. If so, there is sufficient headroom to boost all P0 cores, and that is done in 515 and the TDP_SOC_Margin is updated. The flow then returns to 501 to await another state change.

If the margin in 511 is not greater than zero, the flow goes to 517 to find some margin if possible. Those cores with the highest sensitivity are identified. That may be done, e.g., by accessing the boost sensitivity table provided by the boost sensitivity training discussed above. In 519, the cores in the P0 state are ordered, e.g., in decreasing order of boost sensitivity. Thus, those at the bottom are least sensitive to a frequency increase. In 521, one-by-one the power allocation controller removes a core with the lowest boost sensitivity from the list and re-calculates the New TDP_SOC_Margin as in 509 for all cores still on the list. In other embodiments, all cores having a boost sensitivity below a predetermined or programmable threshold are removed from the list at the same time. The rationale for that is to not waste power by boosting cores whose performance will not be increased. When the New TDP_SOC_Margin is >0, those P0 cores still on the list are transitioned to P-boost and the TDP_SOC_Margin is updated.

In 523, the power allocation controller checks to see if the GPU is in the GPU_P0 state. If not, the flow returns to 501 to await a state change. If the GPU is in the P0 state, the power allocation controller determines if there is sufficient headroom to boost the GPU in 525 by calculating a New TDP_SOC_Margin by subtracting the difference between boosted and current power for the GPU from the current TDP_SOC_Margin. In 527, the power allocation controller checks to see if the new margin is greater than zero, and if so, transitions the GPU to its boosted state and updates the TDP_SOC_Margin and returns to 503 to await another state change in any of the components. If there is not sufficient margin, the flow returns to 503.

Thus, one embodiment has been described for allocating power to those computational units in the P0 state when there is sufficient margin and finding that margin by eliminating those computational units that are less sensitive to a frequency boost. In other embodiments, the frequency boost is only provided, e.g., to those computational units with a sufficiently high boost sensitivity, e.g., above a predetermined or programmable threshold, to warrant the extra power. In that way, increased performance can be provided while still trying to maintain reduced power consumption where possible.

The functionality in FIG. 5 may be implemented in hardware (e.g., state machines), in firmware (in microcode or a microcontroller), or in software (e.g., a driver, BIOS routine or higher level software), or any appropriate combination of hardware and software to allocate power based on boost sensitivity. Assuming the boost sensitivity information is available from the boost sensitivity training, in one embodiment, software may be notified of a change in state of any component and implement the approach described in relation to FIG. 5. The software may be stored in computer readable electronic, optical, or magnetic volatile or non-volatile memory in the computer system of FIG. 1 and executed by one or more of the cores. In still other embodiments, the functionality of FIG. 5 is implemented partly in hardware and partly in software according to the needs and capabilities of the particular system.

The availability of boost sensitivity information can be utilized in various ways by the SOC. Central processing unit (CPU) throttling is one example of such utilization. Assume a GPU-bounded application is being executed. That is, the application being executed on the GPU is limited by the performance of the GPU, because, e.g., a current performance state is lower than needed for the particular application. In that case, the CPU cores may be throttled (limit their performance) by imposing a P-state limit on all of the cores (for example, P-state Limit=P2 state). That will release power margin available to the GPU. In an embodiment, a GPU-bounded or CPU-bounded application is identified based data indicating how busy a particular core or GPU is.

Alternatively, only those cores with the lowest performance sensitivity on frequency may be throttled to the P-state limit. For example, in a four-core system, the two cores with the lowest IPS sensitivity to core frequency change, according to the boost sensitivity table, may be throttled by imposing a P-state Limit=P2, while the state of the other cores may be left unchanged. That would release a power margin equivalent to $((Core\_Pwr0-Core\_Pwr2)\times 2)$ for the GPU, where Core_Pwr0 is the power consumed by the core in the P0 state and Core_Pwr2 is the power consumed by a core in the P2 state.

In still other embodiments, when a CPU-bounded (or compute-bounded) application (an application limited by the performance of one or more processing cores) is being executed, since applications often execute on a subset of available cores, cores that are less sensitive to frequency increases (or decreases) may be throttled to provide extra margin to the other cores.

Figure 6:
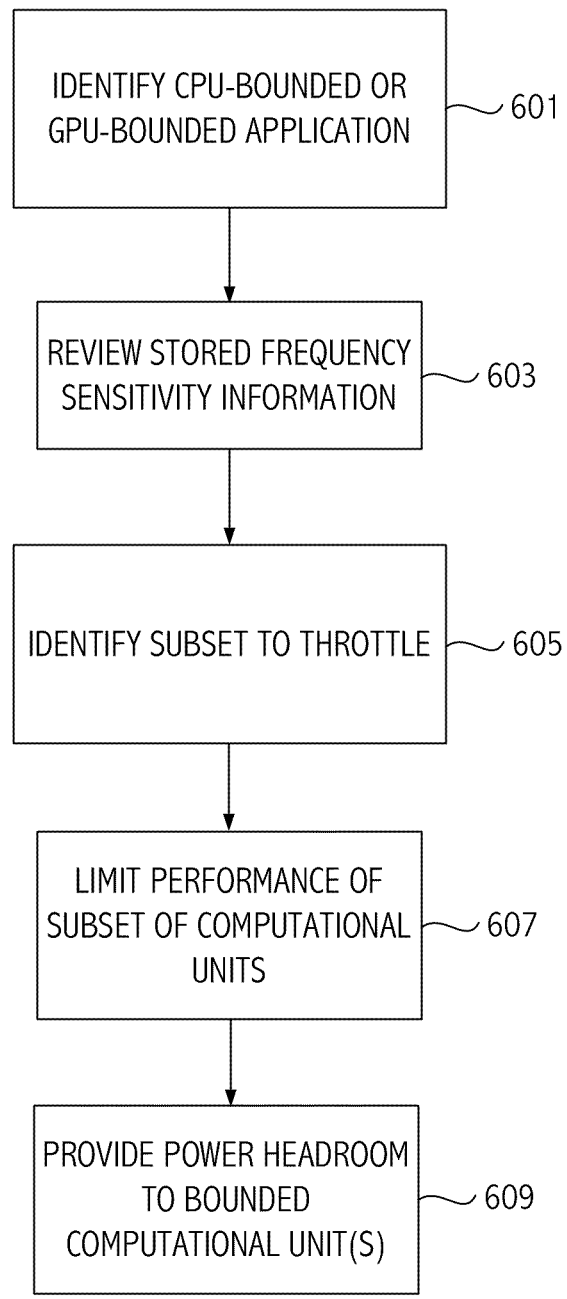
FIG. 6 illustrates an exemplary flow diagram for throttling computational units according to frequency sensitivity.

FIG. 6 shows a high-level flow diagram of performance throttling based on boost sensitivity information. In 601, CPU-bounded or GPU-bounded applications are identified. In 603, the stored boost or performance sensitivity information is reviewed and in 605, a subset of computational units, e.g., processing cores, are identified to throttle based on the subset of the cores being less sensitive in terms of performance to a reduction in performance capability, e.g., a reduction in frequency, voltage, the amount of cache available to a core, the number of pipelines operating in the core, and/or the instruction fetch rate. In 607, the performance of the subset is limited and the power headroom made available through throttling is provided in 609 to the computational unit(s) executing the CPU-bounded and/or GPU-bounded application. The functionality described in FIG. 6 may be implemented in the power allocation controller 109 or in high-level software or utilizing both hardware and software.

If an application mainly utilizes CPU cores, the GPU may be throttled by either forcing a GPU P-state limit lower than GPU_Pwr0 or by throttling its instruction/memory traffic stream. If the throttled GPU power is equivalent to GPU_Pwr2, then the extra power margin, GPU_Pwr0−GPU_Pwr2, can be reallocated for boosting one or more of the CPU cores, depending on the boost sensitivity table values.

When a compute-bounded workload runs on a multi-core processor or on the GPU, memory may also be throttled. One way is to stall every other access to DRAM by a number of cycles, thus reducing the dynamic part of DRAM I/O and DRAM DIMM power by a factor close to 2. Another approach may involve shutting down a number of the available memory channels, also releasing a given percentage of the DRAM I/O and DRAM DIMM power. Reduced DRAM I/O power may be reallocated to either the GPU or CPU cores depending on the utilization of these components and the BST values (as far as the CPU cores are concerned), thus leading to higher overall SOC performance throughput. The DRAM DIMM may not be part of the SOC in which case its power budget is not part of SOC TDP. However, in circumstances where the reduced DRAM DIMM power margin can be reallocated back to the SOC TDP, the extra margin can be used to boost the GPU or some of the CPU cores.

While circuits and physical structures are generally presumed for some embodiments of the invention, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

Thus, various embodiments have been described. Note that the description of the invention set forth herein is illustrative, and is not intended to limit the scope of the invention as set forth in the following claims. For example, while the computational units may be part of a multi-core processor, in other embodiments, the computational units are in separate integrated circuits that may be packaged together or separately. For example, a graphical processing unit (GPU) and processor may be separate integrated circuits packaged together or separately. Variations and modifications of the embodiments disclosed herein may be made based on the description set forth herein without departing from the scope of the invention as set forth in the following claims.

What is claimed is:

1. A method for operating a computer system including a plurality of computational units comprising:
    removing one or more of the computational units with low performance sensitivity from a group of the computational units until a predicted power margin of computational units remaining in the group is greater than zero; and
    boosting performance of the computational units remaining in the group.

2. The method as recited in claim 1 further comprising comparing the respective performance sensitivities of each of the computational units to a threshold value to determine the one or more units with low performance sensitivity.

3. The method as recited in claim 1 wherein the computational units whose performance is boosted are in a same power state prior to being boosted.

4. The method as recited in claim 3 wherein the same power state is a nominal maximum power state.

5. The method as recited in claim 1 wherein the computational units include a plurality of processing cores and the method further comprises:
    removing one or more of the processing cores with low performance sensitivity from a group of the processing cores until a predicted power margin of processing cores remaining in the group is greater than zero; and
    boosting performance of the processing cores remaining in the group.

6. A method for operating a computer system including a plurality of processing cores comprising:
    if a predicted power margin resulting from boosting performance of a group of the cores is less than zero,
        removing a core with low performance sensitivity from the group to form a smaller group; and
        calculating a new predicted power margin and determining if the new predicted power margin is greater than zero if performance of the cores in the smaller group is boosted;
        if the new predicted power margin is greater than zero for the cores in the smaller group, boosting the performance of the cores in the smaller group; and
        if the new predicted power margin for the current group is still less than zero, removing another core with low boost sensitivity from the smaller group to form another smaller group.

7. The method as recited in claim 6 wherein determining the new predicted power margin according to, a current actual power margin-Σ(boosted power-current power), where boosted is power of the cores in the smaller group operated at a boosted power level and current power is power of the cores in the smaller group operating at the current power levels and the current actual power margin is a power margin corresponding to a current power consumption of the computational units.

8. The method as recited in claim 6 further comprising calculating the new predicted power margin according to a difference between power consumption of the cores in the smaller group when boosted from current power consumption of the cores in the smaller group.

9. A method for operating a computer system including a plurality of processing cores comprising:
    if a predicted power margin resulting from boosting performance of a group of the processing cores is less than zero, eliminating one or more processing cores from the group, according to performance sensitivity of the one or more processing cores being lower than performance sensitivity of other of the processing cores, until the predicted power margin is greater than zero; and
    boosting performance of remaining processing cores in the group by increasing at least a frequency of clock signals being supplied to the remaining cores.

10. The method as recited in claim 9 further comprising:
    accessing a storage to determine performance sensitivity of the processing cores, the storage storing a performance sensitivity corresponding to respective process contexts executing on each of the processing cores.

11. An apparatus comprising:
    a plurality of computational units;
    a storage to store performance sensitivity information associated with the computational units; and
    a power allocation function configured to boost performance of one or more of the computational units according to which one or more of the computational units has a higher performance sensitivity, based on the performance sensitivity information, than others of the computational units.

12. The apparatus as recited in claim 11 wherein the power allocation function is configured to compare the performance sensitivity of each of the computational units to a threshold value and to boost computational units according to the comparison.

13. The apparatus as recited in claim 11 wherein the boosted one or more cores are in a same power state immediately prior to being boosted.

14. The apparatus as recited in claim 13 wherein the same power state is a nominal maximum power state.

15. The apparatus as recited in claim 11 wherein the power allocation function is further responsive to a predicted power margin not being sufficient to boost all of a group of cores to a boosted performance state, to remove one or more computational units from the group of computational units, and recalculate a new predicted power margin, the removal being determined according to the one or more computational units from the group having respective boost sensitivities lower than boost sensitivities of other ones of the computational units of the group, the removal and recalculation being repeated until the new predicted power margin is greater than zero to thereby accommodate boosting performance to the boosted performance state.

16. The apparatus as recited in claim 11 wherein the apparatus comprises at least one integrated circuit and the computational units comprise at least one of processing cores, a memory controller, and a graphics processing unit.

17. The apparatus as recited in claim 11 wherein the power allocation function is implemented in one or more of hardware, firmware, and software stored on a computer readable medium.

18. A non-transitory computer readable medium encoding a computer readable description of circuits that include, a plurality of computational units;
   a storage to store performance sensitivity information associated with the computational units; and
   a power allocation function configured to alter performance of one or more of the computational units according to which one or more of the computational units has a higher performance sensitivity, according to the performance sensitivity information, than others of the computational units.

* * * * *